United States Patent
Tadano

(10) Patent No.: US 10,317,438 B2
(45) Date of Patent: Jun. 11, 2019

(54) SIGNAL PROCESSING SYSTEM SIGNAL PROCESSING METHOD AND SIGNAL PROCESSING PROGRAM FOR ESTIMATING OPERATION CONDITIONS FROM PIECES OF CURRENT AND VOLTAGE INFORMATION OF AN ELECTRIC DEVICE

(71) Applicant: INFORMETIS CORPORATION, Tokyo (JP)

(72) Inventor: Taro Tadano, Tokyo (JP)

(73) Assignee: Informetis Corporation, Tokyo (JP)

( * ) Notice: Subject to any disclaimer, the term of this patent is extended or adjusted under 35 U.S.C. 154(b) by 115 days.

(21) Appl. No.: 14/778,477

(22) PCT Filed: Nov. 1, 2013

(86) PCT No.: PCT/JP2013/079667
§ 371 (c)(1),
(2) Date: Sep. 18, 2015

(87) PCT Pub. No.: WO2015/063943
PCT Pub. Date: May 7, 2015

(65) Prior Publication Data
US 2016/0238639 A1 Aug. 18, 2016

(51) Int. Cl.
*G01R 19/25* (2006.01)
*G06Q 20/08* (2012.01)
*G01R 19/175* (2006.01)

(52) U.S. Cl.
CPC ....... *G01R 19/2509* (2013.01); *G01R 19/175* (2013.01); *G01R 19/25* (2013.01); *G06Q 20/0855* (2013.01)

(58) Field of Classification Search
CPC .. G01R 19/2509; G01R 19/175; G01R 19/25; G06Q 20/0855; G06Q 20/322; H02J 17/00; H02J 2007/0096
(Continued)

(56) References Cited

U.S. PATENT DOCUMENTS 8,311,754 B2 * 11/2012 Alles ............... G01D 4/002
702/57
8,700,828 B2 * 4/2014 Harish ............. G06F 13/385
710/63
(Continued)

FOREIGN PATENT DOCUMENTS

EP 2827154 1/2015
JP 04-016771 1/1992
(Continued)

OTHER PUBLICATIONS

Office Action issued in Application P2015-544737, dated Jan. 26, 2016, 8 pages.
(Continued)

*Primary Examiner* — Gene N Auduong
(74) *Attorney, Agent, or Firm* — K&L Gates LLP

(57) ABSTRACT

A signal processing system is provided and includes: a measurement apparatus that measures current and voltage which are supplied to a plurality of electric devices; and a processing apparatus that is connected to the measurement apparatus that estimates operation conditions of the respective electric devices. The measurement apparatus includes a detection unit that detects analog waveform data, a conversion unit that samples the analog waveform data and converts the sampled analog waveform data into digital waveform data, and a transmission unit that transmits the digital waveform data to the processing apparatus. The processing apparatus includes a reception unit that receives the digital waveform data, a storage unit that stores the digital waveform data, a separation unit that separates the stored digital waveform data into pieces, and an operation estimation unit that analyzes the pieces of digital waveform data and estimates the operation conditions.

16 Claims, 8 Drawing Sheets

(58) Field of Classification Search
USPC .................................................. 702/64, 61
See application file for complete search history.

(56) References Cited

U.S. PATENT DOCUMENTS

| | | | |
|---|---|---|---|
| 9,008,980 B2* | 4/2015 | Takakura | G05B 11/01 |
| | | | 700/291 |
| 9,612,286 B2* | 4/2017 | Gupta | G01R 31/34 |
| 2011/0144932 A1* | 6/2011 | Alles | G01D 4/002 |
| | | | 702/61 |
| 2012/0004871 A1 | 1/2012 | Tsao et al. | |
| 2012/0041696 A1 | 2/2012 | Sanderford, Jr. et al. | |
| 2012/0313789 A1 | 12/2012 | Hasuo et al. | |

FOREIGN PATENT DOCUMENTS

| | | |
|---|---|---|
| JP | 09-005362 | 1/1997 |
| JP | 10-319049 | 12/1998 |
| JP | 11-083915 | 3/1999 |
| JP | 2008-039492 | 2/2008 |
| JP | 5235479 | 11/2009 |
| JP | 2011-058921 | 3/2011 |
| JP | 2012-016270 | 1/2012 |
| JP | 2012-154764 | 8/2012 |
| JP | 2012-255744 | 12/2012 |
| JP | 2013-044736 | 3/2013 |
| JP | 2013-053861 | 3/2013 |
| JP | 2013-213825 | 10/2013 |
| JP | 2013-218715 A | 10/2013 |
| WO | 2013/136935 | 9/2013 |

OTHER PUBLICATIONS

Extended European Search Report dated Nov. 30, 2016 in corresponding European application No. 13896632.0 (5 pages).
Japanese Office Action dated May 23, 2017 in corresponding Japanese Application No. 2015-544737.
International Search Report issued in connection with International Patent Application No. PCT/JP2013/079667, dated Jan. 28, 2014. (2 pages).
Decision of Refusal (with English translation) dated Apr. 19, 2016 in corresponding Japanese Application No. 2015-544737 (3 pages).

* cited by examiner

FIG. 3
(a)
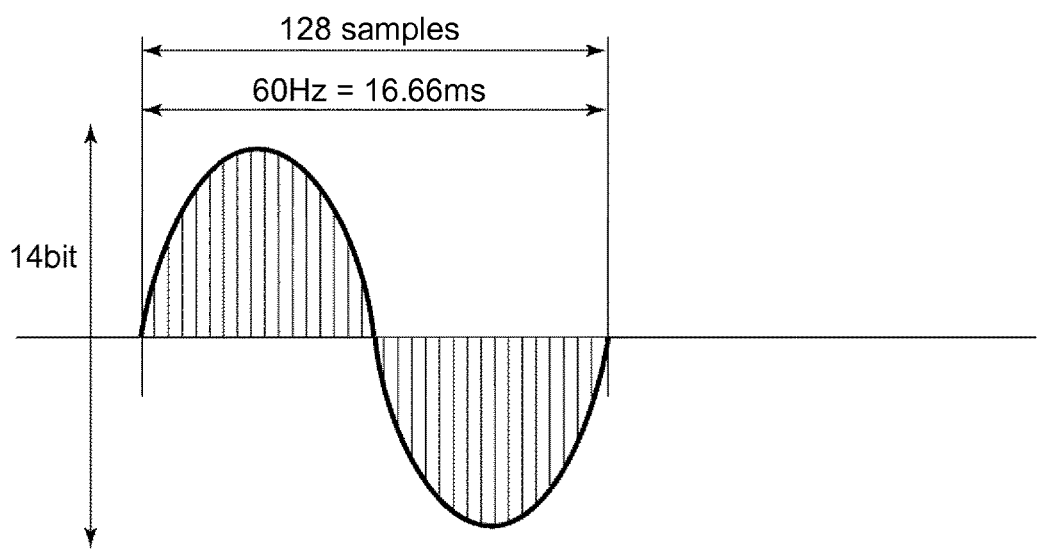
(b)
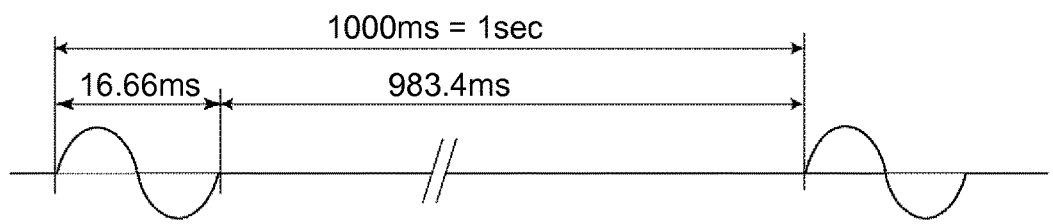

FIG. 6
(a)
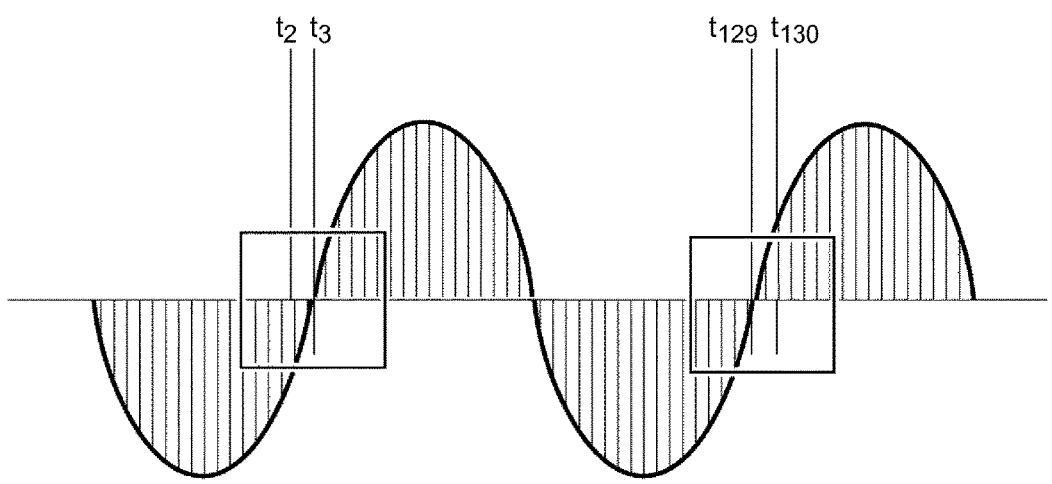
(b)
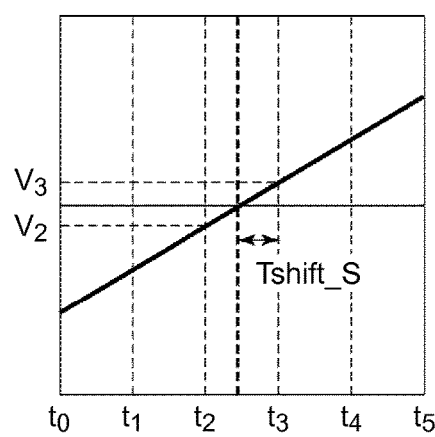
(c)
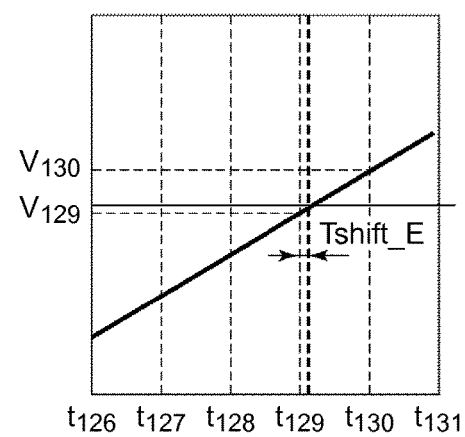

FIG. 7
(a)
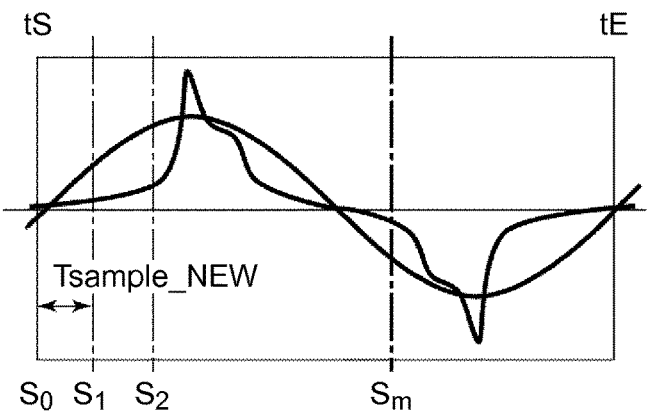
(b)
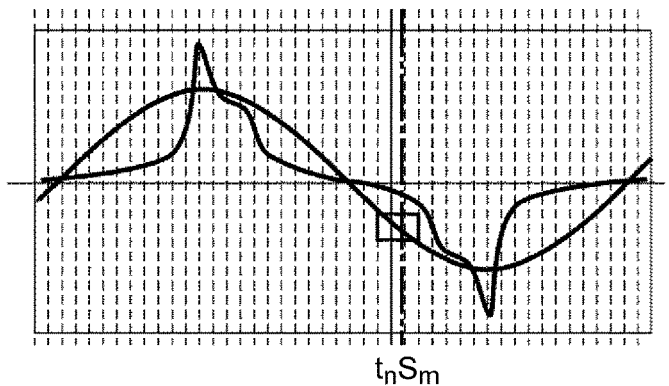
(c)
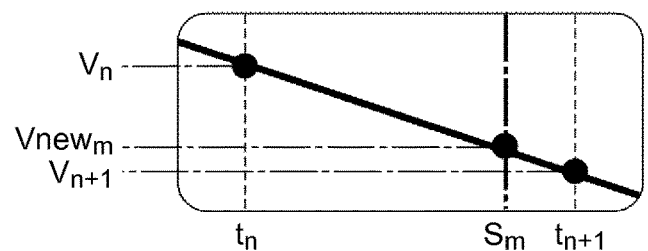

SIGNAL PROCESSING SYSTEM SIGNAL PROCESSING METHOD AND SIGNAL PROCESSING PROGRAM FOR ESTIMATING OPERATION CONDITIONS FROM PIECES OF CURRENT AND VOLTAGE INFORMATION OF AN ELECTRIC DEVICE

CROSS REFERENCES TO RELATED APPLICATIONS

The present application is a national stage of International Application No. PCT/JP2013/079667 filed on Nov. 1, 2013, the disclosure of which is incorporated herein by reference.

BACKGROUND

The present invention relates to a signal processing system, a signal processing method, and a signal processing program, and more particularly, to a signal processing system that estimates operation conditions from pieces of current and voltage information of an electric device, a signal processing method and a signal processing program.

In recent years, a technique for separately estimating a current flowing through each of electric devices by measuring a current flowing through a master of a distribution board has been proposed. There has thus been a great advantage in that it is possible to ascertain power consumption of a facility through one measurement of the master of the distribution board.

For example, Patent Document 1 discloses a technique of estimating an electric device from a variation in power operation. This technique relates to a device estimation apparatus that compares the sizes and cycles of power operation variation waveforms of a plurality of electric devices with the size and cycle of a variation in power operation which appears at the time of the intermittent operation of an electric device to thereby estimate the electric device which is intermittently operating.

In the technique disclosed in Patent Document 1, a difference between an on state and an off state is observed, and thus it is possible to ascertain only two values of conditions of the electric devices. In addition, in the technique disclosed in Patent Document 1, determination is performed using a threshold value, and thus it is difficult to detect a threshold value when a large number of electric devices are connected to each other.

On the other hand, as a technique of determining detailed conditions of an electric device, a method using an identification model has been proposed. For example, Patent Document 2 discloses a technique of identifying an electric device using identification models stored in a database. This technique relates to a power monitoring apparatus capable of identifying detailed conditions of an electric device by using identification models corresponding to a plurality of states of the respective electric devices which are stored in a database.

However, in the technique disclosed in Patent Document 2, it is necessary to install a monitoring apparatus for each facility in which an electric device to be monitored is installed, and thus the introduction of the technique incurs great expense. On the other hand, a method of transmitting measurement data to a server installed at a remote location through a communication channel and analyzing the data on the server side is effective. However, when this method is applied to the technique disclosed in Patent Document 2, the amount of transmitted data becomes enormous, and thus there is a concern of restriction on a communication capacity. In addition, when the method is applied to the technique disclosed in Patent Document 1, there is a lower load on a communication capacity, but it is difficult to determine detailed conditions of an electric device.

CITATION LIST

Patent Documents

Patent Document 1: Japanese Patent No. 5235479
Patent Document 2: Japanese Patent Application Laid-Open No. 2012-16270

SUMMARY

Problems to be Solved by the Invention

In view of the above-described situations, an object of the invention is to estimate operation conditions of a plurality of electric devices in detail at a remote location from pieces of current and voltage information of the electric devices while reducing the amount of transmitted data.

Means for Solving the Problems

According to an aspect of the invention, there is provided a signal processing system including: a measurement apparatus that measures current and voltage which are supplied to a plurality of electric devices from a power supply; and a processing apparatus that is connected to the measurement apparatus through a communication channel and estimates operation conditions of the respective electric devices from a measurement result of the measurement apparatus. The measurement apparatus includes a detection unit that detects analog waveform data of the current and the voltage which are supplied to the electric devices, a conversion unit that samples the analog waveform data detected by the detection unit on the basis of a predetermined sampling frequency and converts the sampled analog waveform data into digital waveform data, and a transmission unit that transmits the digital waveform data to the processing apparatus. The processing apparatus includes a reception unit that receives the digital waveform data transmitted from the transmission unit, a storage unit that stores the digital waveform data received by the reception unit, a separation unit that separates the digital waveform data stored in the storage unit into pieces of digital waveform data for the respective electric devices, and an operation estimation unit that analyzes the pieces of digital waveform data separated by the separation unit and estimates the operation conditions of the respective electric devices.

The conversion unit may convert the analog waveform data into the digital waveform data with a predetermined number of samples including three zero-cross points, and stop the conversion until a predetermined period of time elapses when the conversion is terminated.

The predetermined number of samples may be equal to or greater than the number of samples for one cycle of the analog waveform data. The predetermined number of samples may be the number of samples which is obtained by adding the number of samples corresponding to a maximum frequency variation in the analog waveform data to the number of samples for one cycle of the analog waveform data.

The measurement apparatus may further include a storage unit that stores the digital waveform data which is converted by the conversion unit, and a normalization unit that converts the digital waveform data stored in the storage unit into normalized waveform data.

The measurement apparatus may further include a determination unit that determines a waveform cycle from a time of a waveform starting point of the digital waveform data stored in the storage unit and a time of a waveform end point thereof, and the normalization unit may cut out the digital waveform data for the waveform cycle from the time of the waveform starting point.

The normalization unit may generate approximate waveform data of the analog waveform data, calculate a normalization cycle on the basis of the number of samples for one cycle of the analog waveform data and the waveform cycle, and sample the approximate waveform data on the basis of the normalization cycle from the waveform starting point.

The determination unit may compare signs of voltage values at adjacent sampling points of the digital waveform data with each other, set a zero-cross point at which the voltage value is inverted from negative to positive as the waveform starting point, set a zero-cross point at which the voltage value is inverted from positive to negative and which is adjacent to the waveform starting point in a positive direction on a time axis as the waveform end point, and set a differential time between the waveform starting point and the waveform end point as the waveform cycle.

The signal processing system may further include a compression unit that compresses the digital waveform data transmitted to the processing apparatus into an amount of data according to a communication capacity of the communication channel, and a decompression unit that decompresses the compressed waveform data after passing through the communication channel.

The signal processing system may further include a display unit that displays an estimation result of the estimation unit to a user.

According to another aspect of the invention, there is provided a signal processing method including: a measurement step of measuring current and voltage which are supplied to a plurality of electric devices from a power supply; and a processing step of estimating operation conditions of the respective electric devices from a measurement result obtained in the measurement step. The measurement step includes a detection step of detecting analog waveform data of the current and the voltage which are supplied to the electric devices, a conversion step of sampling the analog waveform data detected in the detection step on the basis of a predetermined sampling frequency and converting the sampled analog waveform data into digital waveform data, and a transmission step of transmitting the digital waveform data. The processing step includes a reception step of receiving the digital waveform data transmitted in the transmission step, a storage step of storing the digital waveform data received in the reception step, a separation step of separating the digital waveform data stored in the storage step into pieces of digital waveform data for the respective electric devices, and an operation estimation step of analyzing the digital waveform data separated in the separation step and estimating the operation conditions of the respective electric devices.

According to a still another aspect of the invention, there is provided a signal processing program causing a computer to realize: a measurement function of measuring current and voltage which are supplied to a plurality of electric devices from a power supply; and a processing function of estimating operation conditions of the respective electric devices from a measurement result of the measurement apparatus.

The measurement function causes a computer to realize a detection function of detecting analog waveform data of the current and the voltage which are supplied to the electric devices, a conversion function of sampling the analog waveform data detected by the detection function on the basis of a predetermined sampling frequency and converting the sampled analog waveform data into digital waveform data, and a transmission function of transmitting the digital waveform data to the processing function. The processing function causes a computer to realize a reception function of receiving the digital waveform data transmitted by the transmission function, a storage function of storing the digital waveform data received by the reception function, a separation function of separating the digital waveform data stored by the storage function into pieces of digital waveform data for the respective electric devices, and an operation estimation function of analyzing the digital waveform data separated by the separation function and estimating the operation conditions of the respective electric devices.

Advantageous Effect of the Invention

According to a signal processing system, a signal processing method, and a signal processing program of the invention, it is possible to estimate operation conditions of a plurality of electric devices in detail at a remote location from pieces of current and voltage information of the electric devices while reducing the amount of transmitted data.

Additional features and advantages are described herein, and will be apparent from the following Detailed Description and the figures.

BRIEF DESCRIPTION OF THE FIGURES

FIG. 3 is a graph illustrating sampling of a conversion unit in the signal processing system according to the embodiment of the invention.

FIG. 6 is a graph illustrating determination of a waveform cycle of a determination unit in the signal processing system according to the embodiment of the invention.

FIG. 7 is a graph illustrating a normalization process of a normalization unit in the signal processing system according to the embodiment of the invention.

DETAILED DESCRIPTION

A signal processing system according to an embodiment of the invention will be described below in detail with reference to the accompanying drawings.

Figure 1:
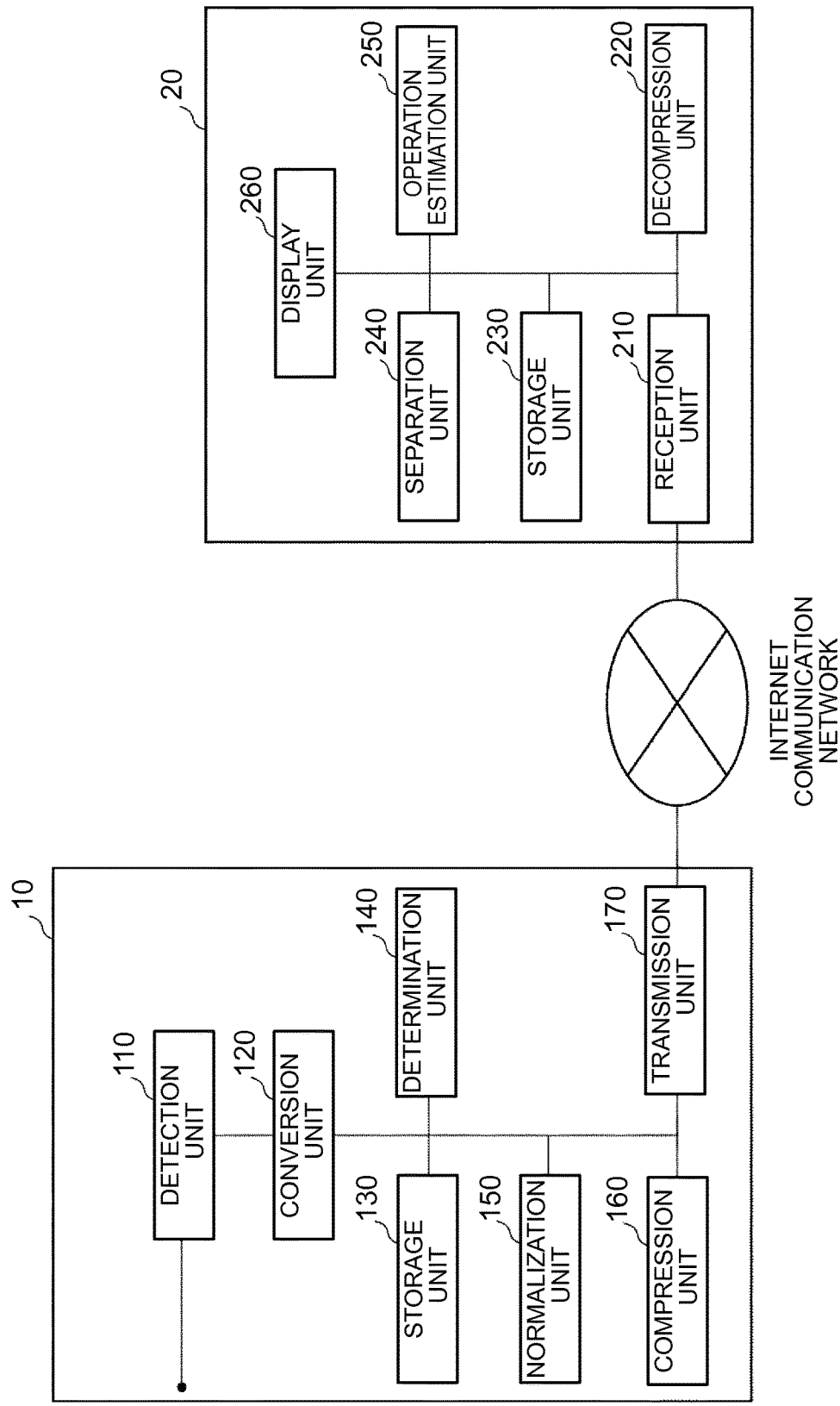
FIG. 1 is a configuration diagram of a signal processing system according to an embodiment of the invention.

FIG. 1 illustrates a configuration diagram of a signal processing system according to an embodiment of the invention.

As illustrated in FIG. 1, the signal processing system of the invention is a signal processing system including a measurement apparatus 10 and a processing apparatus 20. The measurement apparatus 10 includes a detection unit 110, a conversion unit 120, and a transmission unit 170. The processing apparatus 20 includes a reception unit 210, a storage unit 230, a separation unit 240, and an operation estimation unit 250. Meanwhile, FIG. 1 illustrates an example in which the digital information management system 10 further includes a storage unit 130, a determination unit 140, a normalization unit 150, a compression unit 160, a decompression unit 220, and a display unit 260.

Figure 2:
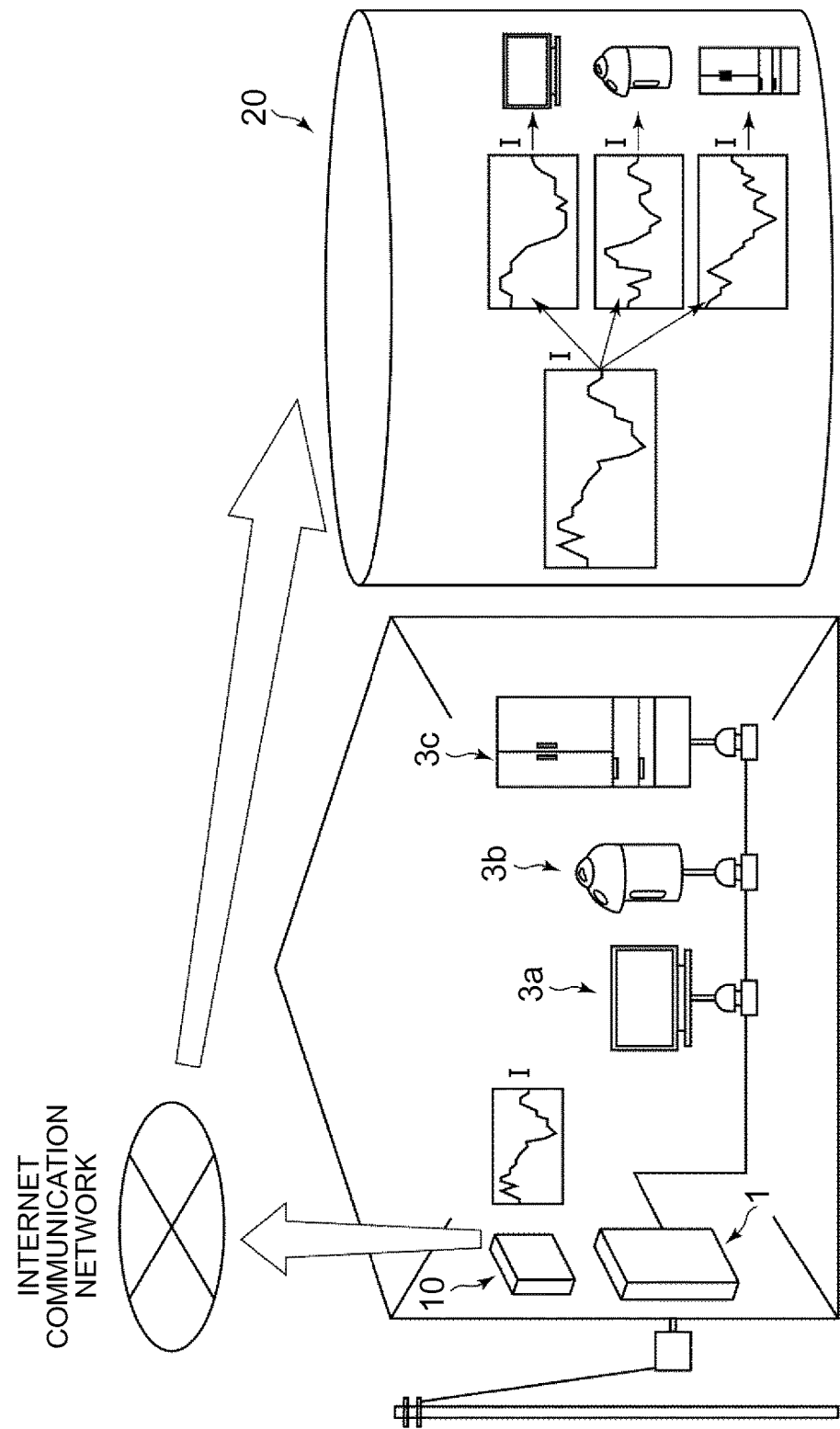
FIG. 2 is a schematic diagram illustrating a flow of processing in the signal processing system according to the embodiment of the invention.

As schematically illustrated in FIG. 2, the signal processing system of the invention measures pieces of waveform data of all currents and voltages which are supplied to a plurality of electric devices from a distribution board 1 by the measurement apparatus 10, separates pieces of waveform data of currents and voltages of the respective electric devices from measurement results by the processing apparatus 20 connected to the measurement apparatus 10 through a communication channel, and estimates operation conditions. FIG. 2 illustrates an example in which a television 3$a$, an electric pot 3$b$ and/or a refrigerator 3$c$ are present as electric devices.

The measurement apparatus 10 measures currents and voltages which are supplied to a plurality of electric devices from a power supply. In addition, the measurement apparatus 10 can measure an effective power amount value for each predetermined time and/or can estimate the amount of power per a predetermined time from the amount of power for one cycle on the basis of pieces of waveform data of currents and voltages.

The processing apparatus 20 is connected to the measurement apparatus 10 through a communication channel, and estimates operation conditions of the respective electric devices from measurement results of the measurement apparatus 10.

The detection unit 110 detects analog waveform data of a current and a voltage which are supplied to an electric device. The detection unit 110 can be installed in an amperemeter portion on the master side of the distribution board 1 in the home. The detection unit 110 can measure a voltage in a range of, for example, 100 V to 200 V or 220 V to 240 V. The detection unit 110 can measure a current having an upper limit of, for example, 60 A, 120 A, or 300 A. When a power supply is a single-phase three wire type power supply, the detection unit 110 can detect a total of three channels of a current of 2 channels and a voltage of 1 channel.

The conversion unit 120 samples analog waveform data detected by the detection unit 110 on the basis of a predetermined sampling frequency and converts the analog waveform data into digital waveform data. The conversion unit 120 can set a resolution of analog/digital conversion to 14 bits or more, can set a sampling frequency to 7680 sample/sec or more per one channel, can set an input offset to one least significant bit or less, and can set a measurement error to ±1% or less. The conversion unit 120 can adjust the input offset and/or the measurement error by hardware and/or firmware on the basis of a predetermined corrected value. For example, the predetermined corrected value can be embedded in a nonvolatile memory within the measurement apparatus 10 at the time of shipment from a factory and/or can be downloaded through a communication channel.

The transmission unit 170 transmits digital waveform data to the processing apparatus 20. The transmission unit 170 can establish connection to a relay device such as a home server by connection setting means such as a WPS, and can transmit communication data such as digital waveform data to a predetermined communication channel through the relay device. The transmission unit 170 can be connected to the processing apparatus 20 in a wireless and/or wired manner, for example, through the Internet and/or a dedicated communication network. A transmission standard of wireless communication can be set to be, for example, IEEE802.11b and/or a backward-compatible communication standard. A transmission standard of wired communication can be set to be, for example, Ethernet (100Base-T) or a backward-compatible communication standard. In communication with the processing apparatus 20, the transmission unit 170 can set an effective communication rate of both uploading and downloading to 19.2 kbps or more, can set a communication interval to once or more per second, and/or can set a wireless reachable distance to have an error rate of 1% or less at an output of 0 dBm and a view of 100 m.

The transmission unit 170 can be connected to a relay device by a communication protocol such as a transmission control protocol/internet protocol (TCP/IP). In addition, the measurement apparatus 10 may acquire an IP address and the like from the relay device using, for example, a dynamic host configuration protocol (DHCP).

The transmission unit 170 may further communicate with the processing apparatus 20 by encoding communication data. The transmission unit 170 can perform secure communication such as hypertext transfer protocol secure (HTTPS) in which communication data is encoded by a protocol such as, for example, a secure sockets layer (SSL). In addition, the transmission unit 170 may use a hash function for the encoding of transmitted data. The transmission unit 170 can perform authentication management using, for example, a hash-based message authentication code (HMAC).

The reception unit 210 receives digital waveform data which is transmitted from the transmission unit 170. When digital waveform data and the like are encoded in the transmission unit 170, the reception unit 210 can decode the original digital waveform data and the like.

The storage unit 230 stores the digital waveform data which is received by the reception unit 210. The storage unit 230 can be configured as a recording medium such as a hard disk and/or a nonvolatile memory. The storage unit 230 may temporarily store digital waveform data for a period of time until processing is completed, or may store digital waveform data for a period of time according to use such as data backup.

The separation unit 240 separates the digital waveform data stored in the storage unit 230 into pieces of digital waveform data for the respective electric devices. The separation unit 240 can separate digital waveform data using, for example, a factorial hidden Markov model (HMM). Specifically, first, the separation unit 240 can obtain model parameters in which operation conditions of the respective electric devices are modeled. Next, the separation unit 240 can separate the acquired digital waveform data into a plurality of state variables for each time series by a factorial HMM. Further, the separation unit 240 can detect a state variable which is suitable for model parameters of the same electric device among the separated state variables. In addition, when one electric device is expressed by a plurality of state variables, the separation unit 240 may detect that the plurality of state variables correspond to the same electric device.

The operation estimation unit 250 analyzes the pieces of digital waveform data separated by the separation unit 240 and estimates operation conditions of the respective electric devices. The operation estimation unit 250 can estimate which operation condition of which electric device each state variable corresponds to. The operation estimation unit 250 can store the type of electric device such as, for example, the television 3a, the electric pot 3b, and/or the refrigerator 3c and a current waveform pattern for each operation condition and can compare the current waveform patterns with a state variable which is actually acquired, to thereby estimate the type of electric device and operation conditions. The operation conditions may be information such as, for example, the power consumption, operation level, abnormality, deterioration, and/or presence of the electric device.

The operation estimation unit 250 can also analyze a user's power demand details from information of each electric device. Further, the operation estimation unit 250 can also derive a recommended method of using an electric device according to a power demand response and a variation in price on the basis of the analysis of consumption details. In addition, the operation estimation unit 250 can also derive predetermined information to be presented to a user on the basis of the pieces of information of the respective electric devices. The predetermined information refers to recommendation of the execution of maintenance of an electric device, recommendation of replacement purchase, a notice of turn-off forgetfulness, and/or a notice of a fire or damage. In addition, the predetermined information may be information derived by combining pieces of information of a plurality of electric devices. For example, the predetermined information may be information obtained by estimating a user's behavior from operation conditions of the plurality of electric devices and/or information obtained by estimating user's conditions from abnormalities of the plurality of electric devices.

The demand response refers to a change in price according to a power demand and return of a reward. The demand response includes, for example, dynamic setting of a fee so that a power price rises in a peak time period during which restricted supply and demand balance is expected and/or includes return of points by the amount of power saved.

As described above, according to the signal processing system of the invention, it is possible to estimate operation conditions of a plurality of electric devices in detail at a remote location from pieces of current and voltage information of the electric devices while reducing the amount of transmitted data.

The conversion unit 120 converts analog waveform data into digital waveform data by a predetermined number of samples including three zero-cross points. When the conversion is terminated, the conversion can be stopped until a predetermined period of time elapses.

The predetermined number of samples can be set to equal to or more than the number of samples of analog waveform data for one cycle.

FIG. 3 is a graph illustrating sampling of the conversion unit 120 in the signal processing system according to the embodiment of the invention. FIG. 3 illustrates an example in which the conversion unit 120 samples analog waveform data of a frequency of 60 Hz and 3-channel current and voltage to digital waveform data at one cycle per second, a resolution of 14 bits, and with a number of samples of 128.

As illustrated in FIG. 3(a), the conversion unit 120 can sample analog waveform data at a time interval of approximately 16.6 ms for one cycle and with a number of samples of 128. At this time, a sampling rate is set to 128 [sample/sec]/16.66 [ms]≅7680 [sample/sec]. In addition, the conversion unit 120 can express a zero value by a central value of an output. In the case of a resolution of 14 bits, the conversion unit 120 can express a zero value by 8192.

As illustrated in FIG. 3(b), the conversion unit 120 can sample pieces of digital waveform data of a current and a voltage for a period of time of approximately 16.66 ms and can manage the pieces of data as pairs. Thereafter, the conversion unit 120 can stop conversion until a period of time of approximately 983.4 ms elapses. At this time, the amount of data is set to 14 [bit]×128 [sample/sec]×3 [channel]=5376 [bit/sec].

The conversion unit 120 can sample three channels of two current channels and one voltage channel at the same time.

In addition, when it is not possible to sample the three channels at the same time due to the restriction of hardware or the like, the conversion unit 120 can also perform sampling by delaying each sampling timing by one cycle of a waveform in a state where a current of 1 channel and a voltage are formed as a pair.

The predetermined number of samples can also be set to be the number of samples which is obtained by adding the number of samples corresponding to a maximum frequency variation of analog waveform data to the number of samples for one cycle of the analog waveform data.

Figure 4:
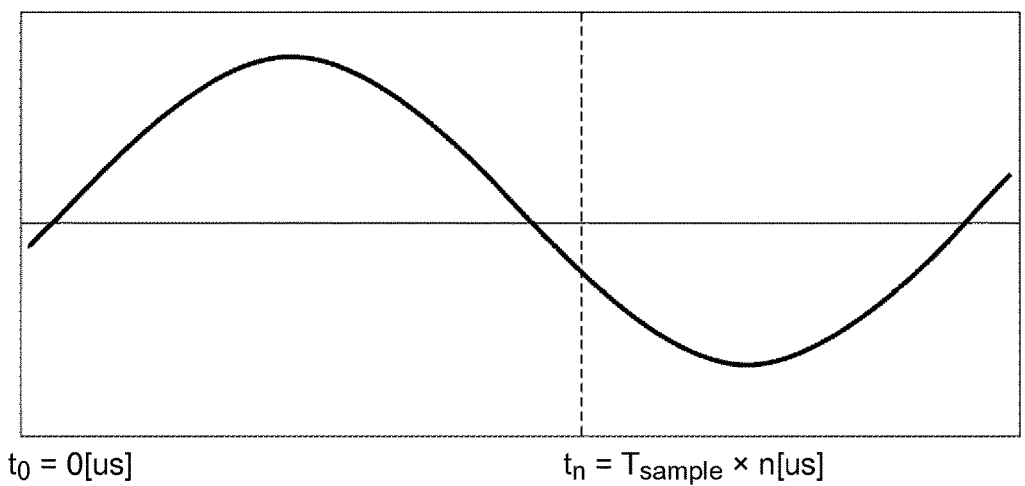
FIG. 4 is a graph illustrating the number of samplings of the conversion unit in the signal processing system according to the embodiment of the invention.

FIG. 4 is a graph illustrating the number of samples of the conversion unit 120 in the signal processing system according to the embodiment of the invention. FIG. 4 illustrates an example in which the conversion unit 120 performs sampling when the number of samples for one cycle of analog waveform data is 128 and a maximum frequency variation is ±0.6%.

For example, the conversion unit 120 can additionally sample two samples before and after 128 samples and can perform sampling so that three zero-cross points fall within 132 samples.

Further, the measurement apparatus 10 can include the storage unit 130 that stores digital waveform data converted by the conversion unit 120 and the normalization unit 150 that converts the digital waveform data stored in the storage unit 130 into normalized waveform data.

The storage unit 130 can be configured as a recording medium such as, for example, a hard disk and/or a nonvolatile memory. In addition, the storage unit 130 can have a capacity according to the amount of digital waveform data.

Further, the measurement apparatus 10 can include the determination unit 140 that determines a waveform cycle from the time of a waveform starting point of the digital waveform data stored in the storage unit 130 and the time of a waveform end point thereof. The normalization unit 150 can cut out digital waveform data for a waveform cycle from the time of the waveform starting point.

The normalization unit 150 can generate approximate waveform data of analog waveform data, can calculate a normalization cycle on the basis of the number of samples for one cycle of the analog waveform data and a waveform cycle, and can sample the approximate waveform data on the basis of the normalization cycle from the waveform starting point.

Figure 5:
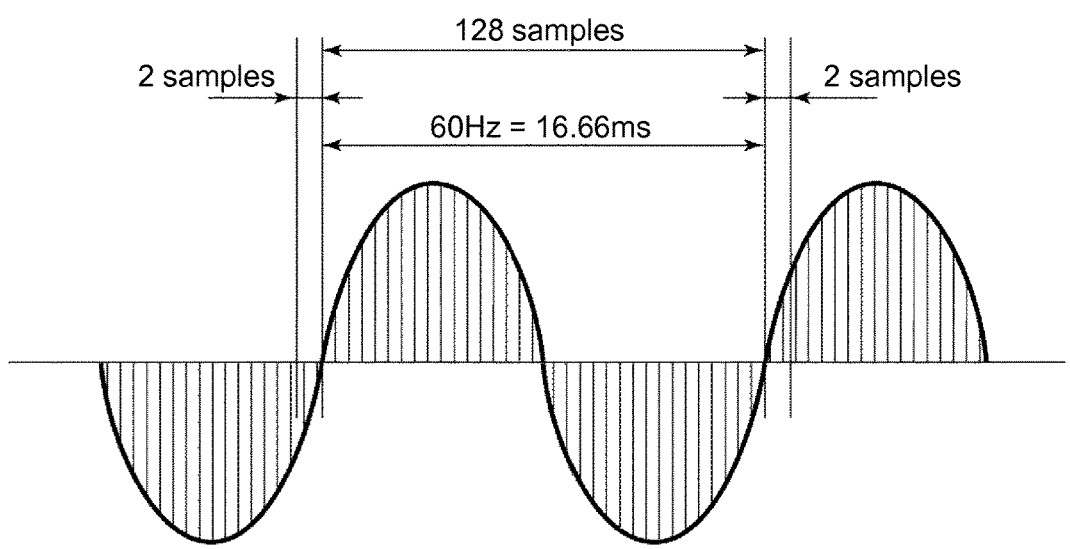
FIG. 5 is a graph illustrating a phase shift in the signal processing system according to the embodiment of the invention.

The normalization unit 150 can correct a deviation between a starting point and an end point of digital waveform data as illustrated in FIG. 5 and a starting point and an end point of sampling, and can accurately cut out a voltage for one period and current waveform data from the starting point of the digital waveform data by performing sampling on the basis of a normalization cycle.

The determination unit 140 can compare signs of voltage values at adjacent sampling points of digital waveform data with each other, can set a zero-cross point at which the voltage value is inverted from negative to positive as a waveform starting point, can set a zero-cross point at which the voltage value is inverted from negative to positive and which is adjacent to the waveform starting point in a positive direction on a time axis as a waveform end point, and can set a differential time between the waveform starting point and the waveform end point as a waveform cycle.

Further, the signal processing system can include the compression unit 160 that compresses digital waveform data transmitted to the processing apparatus into the amount of data according to a communication capacity of a communication channel, and the decompression unit 220 that decompresses the compressed waveform data after passing through the communication channel.

The compression unit 160 can perform high-compression reversible encoding by performing compression into encoded data obtained by performing parametric encoding on digital waveform data and differential encoded data obtained by encoding differential data between decoded data of the encoded data and the input digital waveform data. The differential data is encoded by a code for efficiently compressing a difference. The differential data can be encoded by entropy encoding such as, for example, Huffman encoding or arithmetic encoding, linear prediction encoding, and/or differential encoding.

The decompression unit 220 can decode the encoded data and the differential encoded data which are compressed by the compression unit 160 and can add up the pieces of decoded data to thereby decompress the added-up data to the original digital waveform data.

Further, the signal processing system can include the display unit 260 that displays an estimation result in the operation estimation unit 250 to a user.

The display unit 260 can automatically list pieces of information of the respective electric devices and display the listed information on the basis of the estimation result. The pieces of information of the respective electric devices may include, for example, real-time operation conditions, the frequency of use, and/or power consumption of the electric devices.

Hereinafter, a normalization process of the determination unit 140 and the normalization unit 150 according to the embodiment of the invention will be described in detail.

When digital waveform data is input, the determination unit 140 can perform a predetermined preparation process before a normalization process is performed. The predetermined preparation process can refer to a process of correcting a deviation in a time direction between voltage waveform data and current waveform data which is caused by the detection unit 110 and the like, a process of setting a time when the conversion unit 120 performs first sampling to 0, and/or a process of setting coordinates of an intermediate value in two-dimensional coordinates of a voltage value and a current value as 0.

As the predetermined preparation process, the determination unit 140 can calculate an absolute time $t_n$ at a predetermined sampling point n on the basis of a sampling cycle $T_{sample}$ as in the following expression (1).

$$t_n = n \times T_{sample} \tag{1}$$

Since the determination unit 140 sets a time accuracy at the time of obtaining $t_n$ to 1 microsecond, the determination unit can make the total of rounding errors of $T_{sample}$ fall within 1 microsecond by including even nanoseconds of the sampling cycle $T_{sample}$ in a calculation formula.

The determination unit 140 can obtain zero-cross points of a starting point and an end point of voltage waveform data after the above-described preparation process is completed. FIG. 6 is a graph illustrating determination of a waveform cycle of a determination unit in the signal processing system according to the embodiment of the invention. FIG. 6 illustrates an example in which a zero-cross point of a starting point of voltage waveform data is present between a sampling point 2 and a sampling point 3 and a zero-cross point of an end point of voltage waveform data is present between a sampling point 129 and a sampling point 130 when the number of samples is 132.

The determination unit 140 can determine a code of data in a forward direction on a time axis from the first sampling point and can determine that a zero-cross point of a waveform starting point is present in a section between a sampling point n−1 and a sampling point n when a code changes from negative to positive at the sampling point n.

When a voltage value at the sampling point n is set to $V_n$, the determination unit 140 can obtain a starting point time deviation Tshift_S between the waveform starting point and time $t_n$ by Expression (2). In computation of Expression (2), the determination unit 140 can avoid a large rounding error from occurring due to computation between voltages by performing the computation in the following order.

$$T\text{shift\_}S = V_n \times T_{sample}/(V_n - V_{n-1}) \tag{2}$$

The determination unit 140 can obtain waveform starting point time $T_S$ from the starting point time deviation Tshift_S by Expression (3).

$$T_S = t_n - T\text{shift\_}s \tag{3}$$

FIG. 6(a) illustrates an example in which a code changes from negative to positive at a sampling point 3 of waveform data. In this case, as illustrated in FIG. 6(b), the determination unit 140 can obtain waveform starting point time $T_S$ as in Expression (4).

$$T_S = t_3 - V_3 \times T_{sample}/(V_3 - V_2) \tag{4}$$

The determination unit 140 can determine a code of data in a reverse direction on a time axis from a final sampling point (time $t_E$), and can determine that a zero-cross point of a waveform end point is present in a section between a sampling point n and a sampling point n+1 when a code changes from negative to positive at the sampling point n.

When a voltage value at the sampling point n is set to $V_n$, the determination unit 140 can obtain an end point time deviation Tshift_E between a waveform end point and time $t_n$ by Expression (5). In computation of Expression (5), the determination unit 140 can avoid a large rounding error from occurring due to computation between voltages by performing the computation in the following order.

$$T\text{shift\_}E = -V_n \times T_{sample}/(V_{n+1} - V_n) \tag{5}$$

The determination unit 140 can obtain a waveform end point time $t_E$ from the end point time deviation Tshift_E by Expression (6).

$$T_E = t_n - T\text{shift\_}E \tag{6}$$

FIG. 5A illustrates an example in which a code changes from negative to positive at a sampling point 129 of waveform data. In this case, as illustrated in FIG. 6(c), the determination unit 140 can obtain a waveform end point time $t_E$ as in Expression (7).

$$T_E = t_{129} + V_{129} \times t_{sample}/(V_{130} - V_{129}) \tag{7}$$

The determination unit 140 can obtain an actual measured period $T_{cycle}$ of a waveform which is measured using the starting point time deviation and the end point time deviation described above by Expression (8).

$$T_{cycle} = T_E - T_S \qquad (8)$$

The normalization unit 150 can derive a normalization cycle $T_{sample\_NEW}$ for performing sampling with a predetermined number of samples M using the actual measured period $T_{cycle}$ of the waveform which is measured, by Expression (9).

$$T_{sample\_NEW} = \frac{T_{cycle}}{M} \qquad (9)$$

The normalization unit 150 can derive an absolute time $S_m$ at a predetermined sampling point m as in Expression (10) using a normalization cycle $T_{sample\_NEW}$.

$$S_m = m \times T_{sample\_NEW} + tS \qquad (10)$$

The normalization unit 150 can generate approximate waveform data of analog waveform data from digital waveform data through linear approximation or the like, and can cut out voltage waveform data and current waveform data exactly for one cycle from the approximate waveform data by using the waveform starting point and the normalization cycle which are mentioned above. The normalization unit 150 may generate approximate waveform data at an arbitrary time before a process of cutting out waveform data is performed.

As illustrated in FIG. 7(*a*), the normalization unit 150 can perform pseudo sampling through computation using a normalization cycle from a starting point to an end point of approximate waveform data.

As illustrated in FIG. 7(*b*), the normalization unit 150 can derive an index n of a sampling point $t_n$ near a sampling point $S_m$ in pseudo sampling as in Expression (11).

$$n = S_m / T_{sample\_NEW} \qquad (11)$$

The normalization unit 150 can derive digital voltage waveform data and digital current waveform data which are normalized on the basis of pieces of measurement data of the above-mentioned sampling point $t_n$ and a sampling point $t_{n+1}$ adjacent thereto.

As illustrated in FIG. 7(*c*), the normalization unit 150 can derive normalized digital voltage waveform data $Vnew_m$ as in Expression (12).

$$Vnew_m = V_n + (V_{n+1} - V_n) \times (S_m - t_n) / T_{sample\_NEW} \qquad (12)$$

The normalization unit 150 can derive normalized digital current waveform data $Inew_m$ as in Expression (13).

$$Inew_m = I_n + (I_{n+1} - I_n) \times (S_m - t_n) / T_{sample\_NEW} \qquad (13)$$

The normalization unit 150 can perform pseudo sampling through computation by using a normalization cycle from a starting point to an end point of approximate waveform data as described above, and can cut out a waveform exactly for one cycle from a starting point of digital waveform data.

It is preferable that the measurement apparatus 10 is small and lightweight and is able to be attached to a wall surface near a distribution board using a double-sided tape. For example, it is preferable that a housing has a size of 60 mm long or less, 70 mm wide or less, and 25 mm thick or less. In addition, the measurement apparatus 10 can include a Wi-Fi (registered trademark) protected setup (WPS (registered trademark)) switch facilitating connection to a relay device such as a home router and setting regarding security and/or a setting initialization switch for returning to the setting of the measurement apparatus 10 at the time of factory shipment.

The measurement apparatus 10 may have a clocking function and can set a clocking error to one second or less in a day. In addition, the measurement apparatus 10 can also set the time through a communication channel.

The measurement apparatus 10 can perform communication with predetermined functions with the processing apparatus 20 using a Web application programming interface (Web API). The measurement apparatus 10 may have functions such as, for example, an activation request with respect to the processing apparatus 20, uploading of information of the measurement apparatus 10, uploading of measurement data, confirmation of an activation instruction of firmware, firmware downloading, confirmation of a rebooting instruction, and/or time setting, as the predetermined functions.

The measurement apparatus 10 can transmit a device ID, for example, a MAC address and/or a serial number, a firmware version, and/or start-up time information to the processing apparatus 20, as the information of the measurement apparatus 10.

The measurement apparatus 10 can perform setting and/or can confirm setting items from a remote location through a communication channel. The measurement apparatus 10 can perform setting and/or can confirm setting items through, for example, a built-in web server and/or through remote login using secure shell (SSH (registered trademark)).

The measurement apparatus 10 may have a remote resetting function. The measurement apparatus 10 may communicate with, for example, the processing apparatus 20 at fixed intervals, and may perform remote resetting when predetermined conditions are satisfied and at the time of firmware updating.

The measurement apparatus 10 can have two states of active and non-active states as normal states. In the case of a non-active state, the measurement apparatus 10 can continue transmitting an activation request to the processing apparatus 20 until an active state is set. When the measurement apparatus 10 performs activation, the measurement apparatus can receive an access key from the processing apparatus 20 with respect to the transmitted activation request. In the case of an active state, the measurement apparatus 10 can have access to the processing apparatus 20 using an access key, and can continue transmitting measurement data to the processing apparatus 20 while performing time setting and confirming an instruction from the processing apparatus 20.

The processing apparatus 20 can activate the measurement apparatus 10, can deactivate the measurement apparatus 10, can receive measurement data from the measurement apparatus 10, can receive device information from the measurement apparatus 10, can transmit a firmware updating instruction to the measurement apparatus 10, can update firmware, can transmit a rebooting instruction to the measurement apparatus 10, can perform rebooting, and/or can set the time of the measurement apparatus 10 through a communication channel.

When the predetermined measurement apparatus 10 is deactivated, the processing apparatus 20 can disable the measurement apparatus 10 from having access to the processing apparatus 20 by invalidating an access key. The processing apparatus 20 can make the measurement apparatus 10 transition to a non-active state at a time when an access key is invalidated.

Subsequently, an example of a signal processing method according to the embodiment of the invention will be described with reference to the accompanying drawings.

Figure 8:
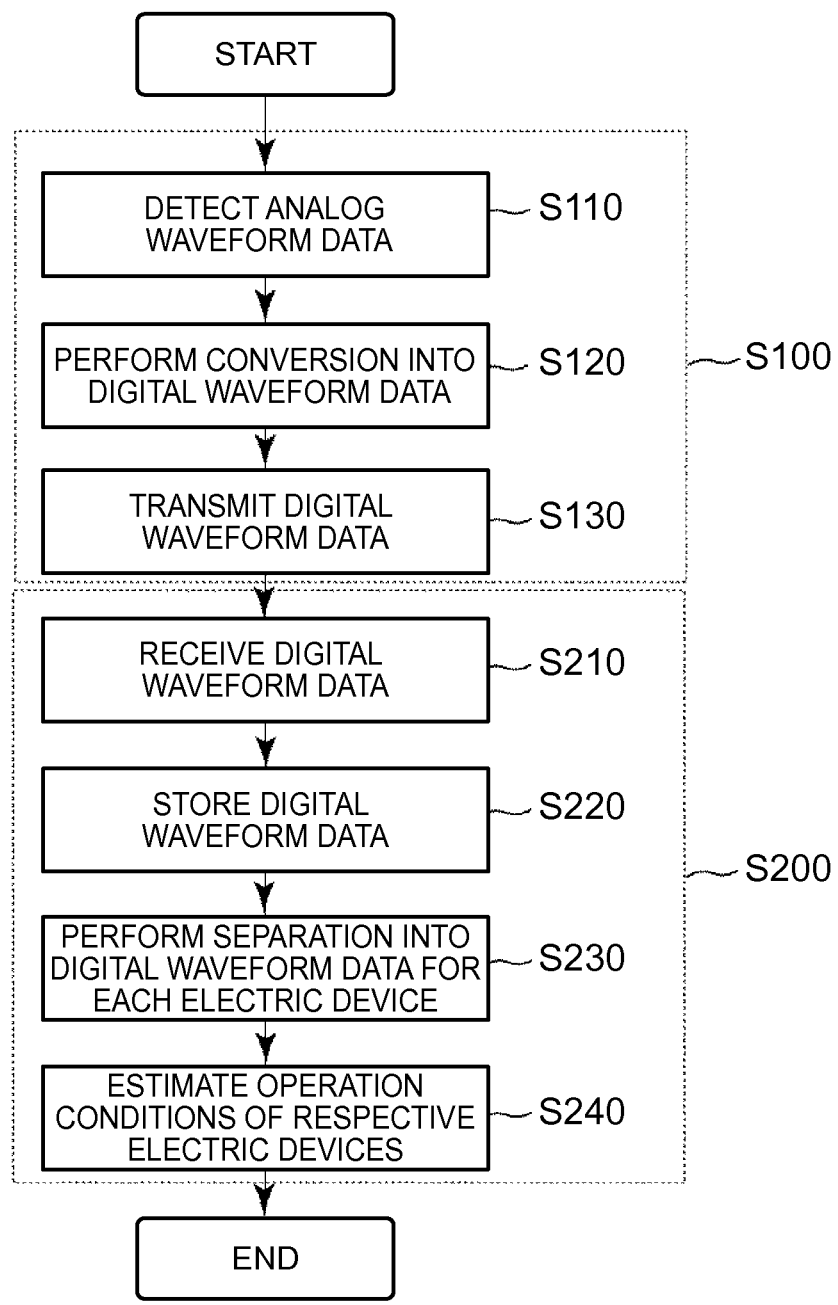
FIG. 8 is a flow chart illustrating processing in a signal processing method according to the embodiment of the invention.

As illustrated in FIG. 8, a signal processing method of the invention is a signal processing method including a measurement step (S100) and a processing step (S200). The measurement step (S100) includes a detection step (S110), a conversion step (S120), and a transmission step (S130). The processing step (S200) includes a reception step (S210), a storage step (S220), a separation step (S230), and an operation estimation step (S240).

In the measurement step (S100), current and voltage supplied to a plurality of electric devices from a power supply are measured. This step can be processed by the measurement apparatus 10 mentioned above.

In the processing step (S200), operation conditions of the respective electric devices are estimated from measurement results in the measurement step (S210). This step can be processed by the processing apparatus 20 mentioned above.

In the detection step (S110), analog waveform data of the current and the voltage which are supplied to the electric devices is detected. This step can be processed by the detection unit 110 mentioned above.

In the conversion step (S120), the analog waveform data detected in the detection step (S110) is sampled on the basis of a predetermined sampling frequency and is converted into digital waveform data. This step can be processed by the conversion unit 120 mentioned above.

In the transmission step (S130), the digital waveform data is transmitted. This step can be processed by the transmission unit 170 mentioned above.

In the reception step (S210), the digital waveform data transmitted in the transmission step (S130) is received. This step can be processed by the reception unit 210 mentioned above.

In the storage step (S220), the digital waveform data received in the reception step (S210) is stored. This step can be processed by the storage unit 230 mentioned above.

In the separation step (S230), the digital waveform data stored in the storage step (S220) is separated into digital waveform data for each electric device. This step can be processed by the separation unit 240 mentioned above.

In the operation estimation step (S240), the digital waveform data separated in the separation step (S230) is analyzed, and operation conditions of the respective electric devices are estimated. This step can be processed by the operation estimation unit 250 mentioned above.

Subsequently, an example of a signal processing program according to the embodiment of the invention will be described.

A signal processing program of the invention is a signal processing program causing a computer to realize a measurement function and a processing function. The measurement function causes a computer to realize a detection function, a conversion function, and a transmission function. The processing function causes a computer to realize a reception function, a storage function, a separation function, and an operation estimation function.

In the measurement function, current and voltage supplied to a plurality of electric devices from a power supply are measured. This function can be realized by the measurement apparatus 10 mentioned above.

In the processing function, operation conditions of the respective electric devices are estimated from a measurement result of the measurement apparatus. This function can be realized by the processing apparatus 20 mentioned above.

In the detection function, analog waveform data of the current and the voltage which are supplied to the electric devices is detected. This function can be realized by the detection unit 110 mentioned above.

In the conversion function, the analog waveform data detected by the detection function is sampled at a predetermined sampling frequency and is converted into digital waveform data. This function can be realized by the conversion unit 120 mentioned above.

In the transmission function, digital waveform data is transmitted to the processing function. This function can be realized by the transmission unit 170 mentioned above.

In the reception function, the digital waveform data transmitted by the transmission function is received. This function can be realized by the reception unit 210 mentioned above.

In the storage function, the digital waveform data received by the reception function is stored. This function can be realized by the storage unit 230 mentioned above.

In the separation function, the digital waveform data stored by the storage function is separated into digital waveform data for each electric device. This function can be realized by the separation unit 240 mentioned above.

In the operation estimation function, the digital waveform data separated by the separation function is analyzed, and operation conditions of the respective electric devices are estimated. This function can be realized by the operation estimation unit 250 mentioned above.

As described above, a signal processing system, a signal processing method, and a signal processing program of the invention have been described so far in detail. However, the invention is not limited to the above-described embodiment, and various improvements and modifications may be made without departing from the scope of the invention.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

DESCRIPTION OF REFERENCE NUMERALS

1 Distribution board
3*a* Television
3*b* Electric pot
3*c* Refrigerator
10 Measurement apparatus
20 Processing apparatus
110 Detection unit
120 Conversion unit
130 Storage unit
140 Determination unit
150 Normalization unit
160 Compression unit
170 Transmission unit
210 Reception unit
220 Decompression unit
230 Storage unit
240 Separation unit
250 Operation estimation unit
260 Display unit

The invention claimed is:

1. A signal processing system comprising:
a measurement apparatus that measures current and voltage which are supplied to a plurality of electric devices from a power supply, the measurement apparatus comprising
a detection unit that detects analog waveform data of the current and the voltage which are supplied to the plurality of electric devices,
a conversion unit that samples the analog waveform data detected by the detection unit on the basis of a predetermined sampling frequency and converts the sampled analog waveform data into digital waveform data, the conversion unit converting the analog waveform data into the digital waveform data by a predetermined number of samples including three zero-cross points, and stops the conversion until a predetermined period of time elapses when the conversion is terminated, the predetermined number of samples is the number of samples which is obtained by adding the number of samples corresponding to a maximum frequency variation of the analog waveform data to the number of samples for one cycle of the analog waveform data,
a transmission unit that transmits the digital waveform data to a processing apparatus,
a storage unit that stores the digital waveform data which is converted by the conversion unit,
a normalization unit that converts the digital waveform data stored in the storage unit into normalized waveform data, and
a determination unit that compares signs of voltage values at adjacent sampling points of the digital waveform data with each other, sets a zero-cross point at which the voltage value is inverted from negative to positive as a waveform starting point, and sets a zero-cross point at which the voltage value is inverted from negative to positive and which is positioned at the waveform starting point in a positive direction on a time axis as a waveform end point, wherein when the determination unit sets a differential time between the waveform starting point and the waveform end point as a waveform cycle, the determination unit sets an absolute time at each sampling point such that total of rounding errors of a sampling cycle fall within one microsecond; and
the processing apparatus that is connected to the measurement apparatus through a communication channel and estimates operation conditions of the respective electric devices from a measurement result of the measurement apparatus,
the processing apparatus comprising
a reception unit that receives the digital waveform data transmitted from the transmission unit,
a storage unit that stores the digital waveform data received by the reception unit,
a separation unit that separates the digital waveform data stored in the storage unit into pieces of digital waveform data for the respective electric devices, and
an operation estimation unit that analyzes the pieces of digital waveform data separated by the separation unit and estimates the operation conditions of the respective electric devices.

2. The signal processing system according to claim 1, wherein the predetermined number of samples is equal to or greater than the number of samples for one cycle of the analog waveform data.

3. The signal processing system according to claim 1, wherein the normalization unit cuts out the digital waveform data for the waveform cycle from the time of the waveform starting point.

4. The signal processing system according to claim 1, wherein the normalization unit generates approximate waveform data of the analog waveform data, calculates a normalization cycle on the basis of the number of samples for one cycle of the analog waveform data and the waveform cycle, and samples the approximate waveform data on the basis of the normalization cycle from the waveform starting point.

5. The signal processing system according to claim 1, wherein the signal processing system further includes
a compression unit that compresses the digital waveform data transmitted to the processing apparatus into an amount of data according to a communication capacity of the communication channel, and
a decompression unit that decompresses the compressed waveform data after passing through the communication channel.

6. The signal processing system according to claim 1, wherein the signal processing system further includes a display unit that displays a result of the estimation in the estimation unit to a user.

7. A signal processing system comprising:
a measurement apparatus that measures current and voltage which are supplied to a plurality of electric devices from a power supply, the measurement apparatus comprising
a detection unit that detects analog waveform data of the current and the voltage which are supplied to the electric device,
a conversion unit that samples the analog waveform data detected by the detection unit on the basis of a predetermined sampling frequency and converts the sampled analog waveform data into digital waveform data, the conversion unit converting the analog waveform data into the digital waveform data by a predetermined number of samples including three zero-cross points, and stops the conversion until a predetermined period of time elapses when the conversion is terminated, the predetermined number of samples is the number of samples which is obtained by adding the number of samples corresponding to a maximum frequency variation of the analog waveform data to the number of samples for one cycle of the analog waveform data,
a transmission unit that transmits the digital waveform data to the processing apparatus,
a storage unit that stores the digital waveform data converted by the conversion unit,
a normalization unit that converts the digital waveform data stored in the storage unit into normalized waveform data, the normalization unit generates approximate waveform data of the analog waveform data, calculates a normalization cycle on the basis of the number of samples for one cycle of the analog waveform data and the waveform cycle, and samples the approximate waveform data on the basis of the normalization cycle from the waveform starting point, and
a determination unit that compares signs of voltage values at adjacent sampling points of the digital waveform data with each other, sets a zero-cross point at which the voltage value is inverted from negative to positive as a waveform starting point, and sets a zero-cross point at which the voltage value is inverted from negative to positive and which is positioned at the waveform starting point in a positive direction on a time axis as a waveform end point, when the determination unit sets a differential time between the waveform starting point and the waveform end point as a waveform cycle, the determination unit sets an absolute time at each sampling point such that total of rounding errors of a sampling cycle fall within one microsecond; and a processing apparatus that is connected to the measurement apparatus through a communication channel and estimates operation conditions of the respective electric devices from a measurement result of the measurement apparatus, the processing apparatus comprising a reception unit that receives the digital waveform data transmitted from the transmission unit, a storage unit that stores the digital waveform data received by the reception unit, a separation unit that separates the digital waveform data stored in the storage unit into pieces of digital waveform data for the respective electric devices, and an operation estimation unit that analyzes the pieces of digital waveform data separated by the separation unit and estimates the operation conditions of the respective electric devices.

8. The signal processing system according to claim 7, wherein the conversion unit converts the analog waveform data into the digital waveform data by a predetermined number of samples including three zero-cross points, and stops the conversion until a predetermined period of time elapses when the conversion is terminated.

9. The signal processing system according to claim 8, wherein the predetermined number of samples is equal to or greater than the number of samples for one cycle of the analog waveform data.

10. The signal processing system according to claim 8, wherein the predetermined number of samples is the number of samples which is obtained by adding the number of samples corresponding to a maximum frequency variation of the analog waveform data to the number of samples for one cycle of the analog waveform data.

11. The signal processing system according to claim 7, wherein the normalization unit cuts out the digital waveform data for the waveform cycle from the time of the waveform starting point.

12. The signal processing system according to claim 7, wherein the signal processing system further includes a compression unit that compresses the digital waveform data transmitted to the processing apparatus into an amount of data according to a communication capacity of the communication channel, and a decompression unit that decompresses the compressed waveform data after passing through the communication channel.

13. The signal processing system according to claim 7, wherein the signal processing system further includes a display unit that displays a result of the estimation in the estimation unit to a user.

14. A signal processing method comprising:

measuring current and voltage which are supplied to a plurality of electric devices from a power supply, the measurement step comprising detecting analog waveform data of the current and the voltage which are supplied to the plurality of electric devices, sampling the analog waveform data detected in the detection step on the basis of a predetermined sampling frequency and converting the sampled analog waveform data into digital waveform data, the conversion step comprising converting the analog waveform data into the digital waveform data by a predetermined number of samples including three zero-cross points, and stopping the conversion until a predetermined period of time elapses when the conversion is terminated, the predetermined number of samples is the number of samples which is obtained by adding the number of samples corresponding to a maximum frequency variation of the analog waveform data to the number of samples for one cycle of the analog waveform data, transmitting the digital waveform data, storing the digital waveform data, converting the digital waveform data into normalized waveform data, and comparing signs of voltage values at adjacent sampling points of the digital waveform data with each other, setting a zero-cross point at which the voltage value is inverted from negative to positive as a waveform starting point, and setting a zero-cross point at which the voltage value is inverted from negative to positive and which is positioned at the waveform starting point in a positive direction on a time axis as a waveform end point, when a differential time between the waveform starting point and the waveform end point is set as a waveform cycle, setting an absolute time at each sampling point such that total of rounding errors of a sampling cycle fall within one microsecond; and estimating operation conditions of the respective electric devices from a measurement result in the measurement step, the estimation step comprising receiving the digital waveform data transmitted in the transmission step, storing the digital waveform data received in the reception step, separating the digital waveform data stored in the storage step into pieces of digital waveform data for the respective electric devices, and analyzing the pieces of digital waveform data separated in the separation step and estimating the operation conditions of the respective electric devices.

15. A signal processing method comprising:

measuring current and voltage which are supplied to a plurality of electric devices from a power supply, the measurement step comprising detecting analog waveform data of the current and the voltage which are supplied to the electric device, sampling the detected analog waveform data on the basis of a predetermined sampling frequency and converting the sampled analog waveform data into digital waveform data, the converting comprising converting the analog waveform data into the digital waveform data by a predetermined number of samples including three zero-cross points, and stops the conversion until a predetermined period of time elapses when the conversion is terminated, the predetermined number of samples is the number of samples which is obtained by adding the number of samples corresponding to a maximum frequency variation of the analog waveform data to the number of samples for one cycle of the analog waveform data, transmitting the digital waveform data, storing the digital waveform data, converting the digital waveform data into normalized waveform data, the conversion step comprising generating approximate waveform data of the analog waveform data, calculating a normalization cycle on the basis of the number of samples for one cycle of the analog waveform data and the waveform cycle, and sampling the approximate waveform data on the basis of the normalization cycle from the waveform starting point, and comparing signs of voltage values at adjacent sampling points of the digital waveform data with each other, setting a zero-cross point at which the voltage value is inverted from negative to positive as a waveform starting point, and setting a zero-cross point at which the voltage value is inverted from negative to positive and which is positioned at the waveform starting point in a positive direction on a time axis as a waveform end point, when a differential time between the waveform starting point and the waveform end point is set as a waveform cycle, setting an absolute time at each sampling point such that total of rounding errors of a sampling cycle fall within one microsecond; and estimating operation conditions of the respective electric devices from a measurement result in the measurement step, the estimation step comprising receiving the digital waveform data transmitted in the transmission step, storing the received digital waveform data, separating the stored digital waveform data into pieces of digital waveform data for the respective electric devices, and analyzing the pieces of digital waveform data and estimating the operation conditions of the respective electric devices.

16. A non-transitory computer readable medium storing a program, which when executed, causes a computer to:

measure current and voltage which are supplied to a plurality of electric devices from a power supply, the measuring comprising detecting analog waveform data of the current and the voltage which are supplied to the electric device, sampling the analog waveform data detected in the detection function on the basis of a predetermined sampling frequency and converting the sampled analog waveform data into digital waveform data, the converting comprising converting the analog waveform data into the digital waveform data by a predetermined number of samples including three zero-cross points, and stopping the conversion until a predetermined period of time elapses when the conversion is terminated, wherein the predetermined number of samples is the number of samples which is obtained by adding the number of samples corresponding to a maximum frequency variation of the analog waveform data to the number of samples for one cycle of the analog waveform data, transmitting the digital waveform data to the processing function, storing the converted digital waveform data, converting the stored digital waveform data into normalized waveform data, the conversion step comprising generating approximate waveform data of the analog waveform data, calculating a normalization cycle on the basis of the number of samples for one cycle of the analog waveform data and the waveform cycle, and sampling the approximate waveform data on the basis of the normalization cycle from the waveform starting point, and comparing signs of voltage values at adjacent sampling points of the digital waveform data with each other, setting a zero-cross point at which the voltage value is inverted from negative to positive as a waveform starting point, and setting a zero-cross point at which the voltage value is inverted from negative to positive and which is positioned at the waveform starting point in a positive direction on a time axis as a waveform end point, when a differential time between the waveform starting point and the waveform end point is set as a waveform cycle, setting an absolute time at each sampling point such that total of rounding errors of a sampling cycle fall within one microsecond; and estimate operation conditions of the respective electric devices from a measurement result, the estimation comprising receiving the transmitted digital waveform data, storing the received digital waveform data, separating the stored digital waveform data into pieces of digital waveform data for the respective electric devices, and analyzing the pieces of digital waveform data and estimating the operation conditions of the respective electric devices.

* * * * *